(12) United States Patent
Taniguchi et al.

(10) Patent No.: US 8,989,979 B2
(45) Date of Patent: Mar. 24, 2015

(54) CONTROL UNIT FOR FOUR-WHEEL-DRIVE VEHICLE

(71) Applicant: JTEKT Corporation, Osaka-shi (JP)

(72) Inventors: Kenta Taniguchi, Anjo (JP); Akira Kodama, Chiryu (JP); Tomoaki Kato, Kariya (JP); Masaki Mita, Chiryu (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/959,040

(22) Filed: Aug. 5, 2013

(65) Prior Publication Data

US 2014/0058638 A1    Feb. 27, 2014

(30) Foreign Application Priority Data

Aug. 21, 2012  (JP) ................................. 2012-182365

(51) Int. Cl.
| G06F 7/00 | (2006.01) |
| G06F 17/00 | (2006.01) |
| G06F 19/00 | (2011.01) |
| G06F 7/70 | (2006.01) |
| G06G 7/00 | (2006.01) |
| G06G 7/76 | (2006.01) |
| B60B 39/00 | (2006.01) |
| B60T 7/12 | (2006.01) |
| G05D 1/00 | (2006.01) |

(Continued)

(52) U.S. Cl.
CPC ................ *B60K 17/34* (2013.01); *B60K 17/35* (2013.01); *B60K 23/08* (2013.01); *B60K 23/0808* (2013.01); *B60K 28/16* (2013.01); *B60W 30/20* (2013.01); *B60W 10/06* (2013.01); *B60W 10/119* (2013.01); *B60W 30/18172* (2013.01); *B60W 2510/0241* (2013.01); *B60W 2720/403* (2013.01); *B60Y 2300/424* (2013.01)
USPC .................................. 701/69; 701/70; 701/71

(58) Field of Classification Search
USPC ..................................................... 701/69–71
See application file for complete search history.

(56) References Cited

U.S. PATENT DOCUMENTS

| 6,000,488 A | 12/1999 | Atkinson |
| 6,062,330 A | 5/2000 | Watson et al. |

(Continued)

FOREIGN PATENT DOCUMENTS

| JP | 2011-255846 | 12/2011 |
| WO | WO 03/074905 A2 | 9/2003 |

(Continued)

OTHER PUBLICATIONS

Extended European Search Report issued Nov. 25, 2013 in Patent Application No. 13180341.3.

*Primary Examiner* — Imran Mustafa
(74) *Attorney, Agent, or Firm* — Oblon, Spivak, McClelland, Maier & Neustadt, L.L.P.

(57) ABSTRACT

A four-wheel-drive vehicle includes a clutch that is able to allow and interrupt transmission of driving force to a propeller shaft, and a traction control unit that controls at least one of the driving force generated by an engine and braking force applied to right and left front wheels to suppress a slip of the right and left front wheels. When the drive mode is switched from a two-wheel-drive mode to a four-wheel-drive mode, if the relative rotational speed between a first rotary member and a second rotary member constituting a clutch is equal to or higher than a predetermined value, an ECU outputs a control command signal for suppressing the slip of the right and left front wheels to the traction control unit.

4 Claims, 5 Drawing Sheets

(51) Int. Cl.

| | | |
|---|---|---|
| *B60K 17/34* | (2006.01) | |
| *B60K 17/35* | (2006.01) | |
| *B60K 23/08* | (2006.01) | |
| *B60K 28/16* | (2006.01) | |
| *B60W 30/20* | (2006.01) | |
| *B60W 10/06* | (2006.01) | |
| *B60W 10/119* | (2012.01) | |
| *B60W 30/18* | (2012.01) | |

(56) References Cited

U.S. PATENT DOCUMENTS

| | | |
|---|---|---|
| 6,263,995 B1 | 7/2001 | Watson et al. |
| 2001/0042652 A1* | 11/2001 | Watson et al. ............... 180/249 |
| 2004/0020700 A1 | 2/2004 | Watson et al. |
| 2007/0068709 A1* | 3/2007 | Olsson ........................ 180/6.24 |
| 2010/0094519 A1* | 4/2010 | Quehenberger et al. ........ 701/69 |
| 2011/0167944 A1* | 7/2011 | Yoshinami et al. .......... 74/473.1 |
| 2012/0089310 A1* | 4/2012 | Sakagami et al. .............. 701/69 |
| 2013/0226421 A1 | 8/2013 | Horaguchi et al. |

FOREIGN PATENT DOCUMENTS

| | | |
|---|---|---|
| WO | WO 03/074905 A3 | 9/2003 |
| WO | WO 2012/035994 A1 | 3/2012 |

\* cited by examiner

CONTROL UNIT FOR FOUR-WHEEL-DRIVE VEHICLE

INCORPORATION BY REFERENCE

The disclosure of Japanese Patent Application No. 2012-182365 filed on Aug. 21, 2012 including the specification, drawings and abstract is incorporated herein by reference in its entirety.

BACKGROUND OF THE INVENTION

1. Field of the Invention

The invention relates to a control unit for a four-wheel-drive vehicle.

2. Description of Related Art

Conventionally, there has been known a four-wheel-drive vehicle provided with main drive wheels (front wheels), to which driving force is always transmitted from a drive source, and auxiliary drive wheels (rear wheels), to which the driving force is transmitted from the drive source depending on a traveling state. The four-wheel-drive vehicle is configured such that, when the vehicle is traveling in a two-wheel-drive mode in which the driving force is transmitted only to the main drive wheels, torque transmission at both ends of a propeller shaft is interrupted to stop rotation of the propeller shaft. In this way, a power loss is reduced. Refer to, for example, Japanese Patent Application Publication No. 2011-255846 (JP 2011-255846 A).

In the four-wheel-drive vehicle described in JP 2011-255846 A, a dog clutch, which transmits torque by the engagement of meshing teeth, and a torque coupling capable of adjusting transmission torque are arranged on a torque transmission path leading to the auxiliary drive wheels. In the four-wheel-drive vehicle, the dog clutch is disposed on the main drive wheel-side of the propeller shaft, and the torque coupling is disposed on the auxiliary drive wheel-side of the propeller shaft. When the drive mode is switched from the two-wheel-drive mode to a four-wheel-drive mode, the torque that is transmitted by a driving force transmission device is increased to increase the rotational speed of the propeller shaft, the torque that is transmitted by the driving force transmission device is then decreased, and the dog clutch is engaged in a state where the transmission torque has been decreased. Thus, it is possible to suppress shocks and vibrations that are generated when the dog clutch is engaged, while reducing the time required to switch the drive mode from the two-wheel-drive mode to the four-wheel-drive mode.

In this type of four-wheel-drive vehicle, for example, when the main drive wheels slip in the two-wheel-drive mode and therefore the speed difference between the rotational speed of the main drive wheels and the rotational speed of the auxiliary drive wheels becomes large, the drive mode is switched to the four-wheel-drive mode to enhance the driving stability. However, when the main drive wheels continue slipping during switching of the drive mode to the four-wheel-drive mode, synchronization in the dog clutch cannot be achieved even if the torque that is transmitted by the driving force transmission device is increased to increase the rotational speed of the propeller shaft. As a result, it is not possible to switch the drive mode to the four-wheel-drive mode.

SUMMARY OF THE INVENTION

One object of the invention is to provide a control unit for a four-wheel-drive vehicle, capable of switching the drive mode to a four-wheel-drive mode promptly even when a slip occurs in main drive wheels.

An aspect of the invention relates to a control unit for a four-wheel-drive vehicle, which is mounted in the four-wheel-drive vehicle. The four-wheel-drive vehicle includes a dog clutch and a traction control unit. The dog clutch is able to switch a drive mode between a four-wheel-drive mode, in which driving force is transmitted from a drive source to main drive wheels and auxiliary drive wheels, and a two-wheel-drive mode, in which the driving force is transmitted from the drive source only to the main drive wheels, and that allows transmission of the driving force from the drive source to the auxiliary drive wheels by engaging a first rotary member arranged on a drive source side and a second rotary member arranged on an auxiliary drive wheel side with each other, and interrupts transmission of the driving force from the drive source to auxiliary drive wheels by disengaging the first rotary member and the second rotary member from each other. The traction control unit controls at least one of the driving force that is generated by the drive source and braking force that is applied to the main drive wheels to suppress a slip of the main drive wheels. The control unit for the four-wheel-drive vehicle outputs a command signal to execute control for suppressing the slip of the main drive wheels to the traction control unit in a case where a relative rotational speed between the first rotary member and the second rotary member of the dog clutch is equal to or higher than a predetermined value when the drive mode is switched from the two-wheel-drive mode to the four-wheel-drive mode.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
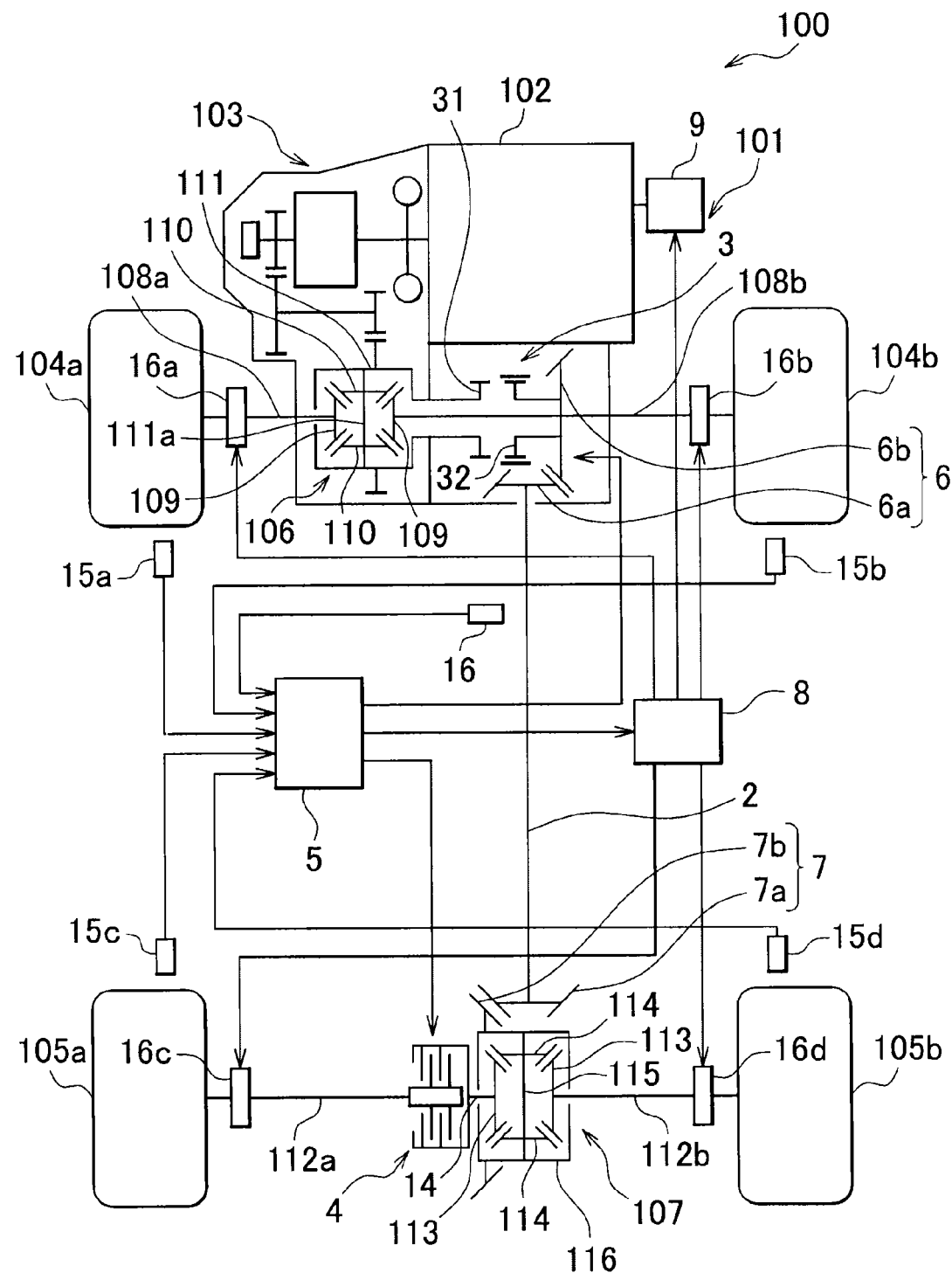
FIG. 1 is a schematic configuration diagram illustrating an example of the schematic configuration of a four-wheel-drive vehicle according to an embodiment of the invention.

Hereinafter, embodiments of the invention will be described with reference to the accompanying drawings. FIG. 1 is a schematic configuration diagram of a four-wheel-drive vehicle 100 according to an embodiment of the invention. As illustrated in FIG. 1, the four-wheel-drive vehicle 100 includes an engine 102, which serves as a drive source that generates torque for causing the four-wheel-drive vehicle 100 to travel, right and left front wheels 104b, 104a, which serve as a pair of right and left main drive wheels to which driving force is always transmitted from the engine 102, and right and left rear wheels 105b, 105a, which serve as a pair of right and left auxiliary drive wheels to which the driving force is transmitted from the engine 102 depending on a traveling state. It is possible to switch the drive mode of the four-wheel-drive vehicle 100 between a four-wheel-drive mode, in which the driving force is transmitted from the engine 102 to the right and left front wheels 104b, 104a and the right and left rear wheels 105b, 105a, and a two-wheel-drive mode, in which the driving force is transmitted from the engine 102 only to the right and left front wheels 104b, 104a.

The four-wheel-drive vehicle 100 has a driving force transmission system 101 including a propeller shaft 2, a dog clutch 3, and a torque coupling 4. The propeller shaft 2 serves as a driving force transmission shaft that transmits the torque from the engine 102 toward the right and left rear wheels 105b, 105a. The dog clutch 3 is arranged between the propeller shaft 2 and the engine 102. The torque coupling 4 serves as a driving force transmission device arranged between the propeller shaft 2 and the left rear wheel 105a.

The four-wheel-drive vehicle 100 includes an electronic control unit (ECU) 5, a traction control unit 8, and a fuel injection device 9. The ECU 5 serves as a control unit that controls the dog clutch 3 and the torque coupling 4. The traction control unit 8 controls at least one of the driving force that is generated by the engine 102 and the braking force that is applied to the right and left front wheels 104b, 104a, thereby suppressing a slip of the right and left front wheels 104b, 104a. The fuel injection device 9 supplies fuel, such as gasoline, to the engine 102.

The four-wheel-drive vehicle 100 is placed in the four-wheel-drive mode when transmission of the driving force by the dog clutch 3 and transmission of the driving force by the torque coupling 4 are both performed, and placed in the two-wheel-drive mode when at least one of transmission of the driving force by the dog clutch 3 and transmission of the driving force by the torque coupling 4 is not performed. When the four-wheel-drive vehicle 100 according to the present embodiment is traveling in the two-wheel-drive mode, transmission of the driving force by the dog clutch 3 and transmission of the driving force by the torque coupling 4 are both interrupted to prevent the propeller shaft 2 from rotating in the two-wheel-drive mode.

The torque generated by the engine 102 is transmitted to the right and left front wheels 104b, 104a via a transmission 103, a front differential 106, and right and left drive shafts 108b, 108a on the front wheel side. The front differential 106 includes a pair of side gears 109, a pair of pinion gears 110, a pinion gear shaft 111a, and a front differential case 111. The side gears 109 are connected respectively to the right and left front wheel-side drive shafts 108b, 108a so as to be non-rotatable relative to the front wheel-side drive shafts 108b, 108a. The pinion gears 110 are meshed with the side gears 109 with the axes of the pinion gears 110 perpendicular to the axes of the side gears 109. The pinion gear shaft 111a supports the pinion gears 110. The front differential case 111 houses the side gears 109, the pinion gears 110 and the pinion gear shaft 111a.

The torque generated by the engine 102 is transmitted to the propeller shaft 2 via the transmission 103, the front differential case 111 of the front differential 106, the dog clutch 3, and a gear mechanism 6 on the front wheel side. The torque generated by the engine 102 and transmitted to the propeller shaft 2 is further transmitted to the right and left rear wheels 105b, 105a via a gear mechanism 7 on the rear wheel side, a rear differential 107, the torque coupling 4, and right and left drive shafts 112b, 112a on the rear wheel side.

The rear differential 107 includes a pair of side gears 113, a pair of pinion gears 114, a pinion gear shaft 115, and a rear differential case 116. The side gears 113 are connected respectively to the right and left drive shafts 112b, 112a. The pinion gears 114 are meshed with the side gears 113 with the axes of the pinion gears 114 perpendicular to the axes of the side gears 113. The pinion gear shaft 115 supports the pinion gears 114. The rear differential case 116 houses the side gears 113, the pinion gears 114 and the pinion gear shaft 115. A side gear shaft 14 is connected to the left side gear 113 among the pair of side gears 113 so as to be non-rotatable relative to the left side gear 113. The drive shaft 112b on the right rear wheel side is connected to the right side gear 113 among the pair of side gears 113 so as to be non-rotatable relative to the right side gear 113.

A pinion gear 6a is connected to one end of the propeller shaft 2, which is on the torque transmission upstream side (the engine 102 side), and a pinion gear 7a is connected to the other end of the propeller shaft 2, which is on the torque transmission downstream side (the rear wheels 105a, 105b side). The pinion gear 6a is meshed with a ring gear 6b that serves as an output member of the dog clutch 3. The pinion gear 7a is meshed with a ring gear 7b fixed to the rear differential case 116. The pinion gear 6a and the ring gear 6b constitute the gear mechanism 6 on the front wheel side, and the pinion gear 7a and the ring gear 7b constitute the gear mechanism 7 on the rear wheel side.

Rotational speed sensors 15a, 15b, rotational speed sensors 15c, 15d, and a rotational speed sensor 16 are connected to the ECU 5. The rotational speed sensors 15b, 15a detect the rotational speeds of the right and left front wheels 104b, 104a, respectively. The rotational speed sensors 15d, 15c detect the rotational speeds of the right and left rear wheels 105b, 105a, respectively. The rotational speed sensor 16 detects the rotational speed of the propeller shaft 2. The rotational speed sensors 15a to 15d and the rotational speed sensor 16 are each formed of, for example, a Hall IC that is arranged so as to face a magnetic ring that has a plurality of magnetic poles and that rotates together with a corresponding one of the right and left front wheels 104b, 104a, the right and left rear wheels 105b, 105a and the propeller shaft 2. The rotational speed sensors 15a to 15d and the rotational speed sensor 16 each output a pulse signal with a period that corresponds to the rotational speed of a corresponding one of the right and left front wheels 104b, 104a, the right and left rear wheels 105b, 105a and the propeller shaft 2. On the basis of the signals, the ECU 5 is able to detect the rotational speeds of the right and left front wheels 104b, 104a, the right and left rear wheels 105b, 105a, and the propeller shaft 2. The ECU 5 is able to detect the rotational speed of the front differential case 111 by computing an averaged value of the rotational speeds of the right and left front wheels 104b, 104a.

The four wheel drive 100 includes braking devices 16b, 16a for the right and left front wheels 104b, 104a, respectively, and braking devices 16d, 16c for the right and left rear wheels 105b, 105a, respectively. Each of the braking devices 16a to 16d includes, for example, a brake rotor and a brake caliper having brake pads between which the brake rotor is fastened. By changing the hydraulic pressures of brake oils that are supplied to the brake calipers, it is possible to individually control the braking forces that are applied to the respective wheels.

The traction control unit 8 has a braking force control function of controlling the braking forces that are applied by the braking devices 16a to 16d to suppress a slip, when the slip occurs in any one of the right and left front wheels 104b, 104a and the right and left rear wheels 105b, 105a while the four-wheel-drive vehicle 100 is traveling on, for example, a low μ road (low friction road). In addition, the traction control unit 8 has a function of suppressing the slip by outputting a command signal to the fuel injection device 9 to reduce the amount of fuel that is supplied to the engine 102, thereby reducing the driving force that is generated by the engine 102. If, for example, the right front wheel 104b slips, the traction control unit 8 causes the braking device 16b to apply braking force to the right front wheel 104b to suppress the slip of the right front wheel 104b. At the same time, the traction control unit 8 reduces the driving force that is generated by the engine 102, thereby further reliably suppressing the slip of the right front wheel 104b.

Figure 2A:
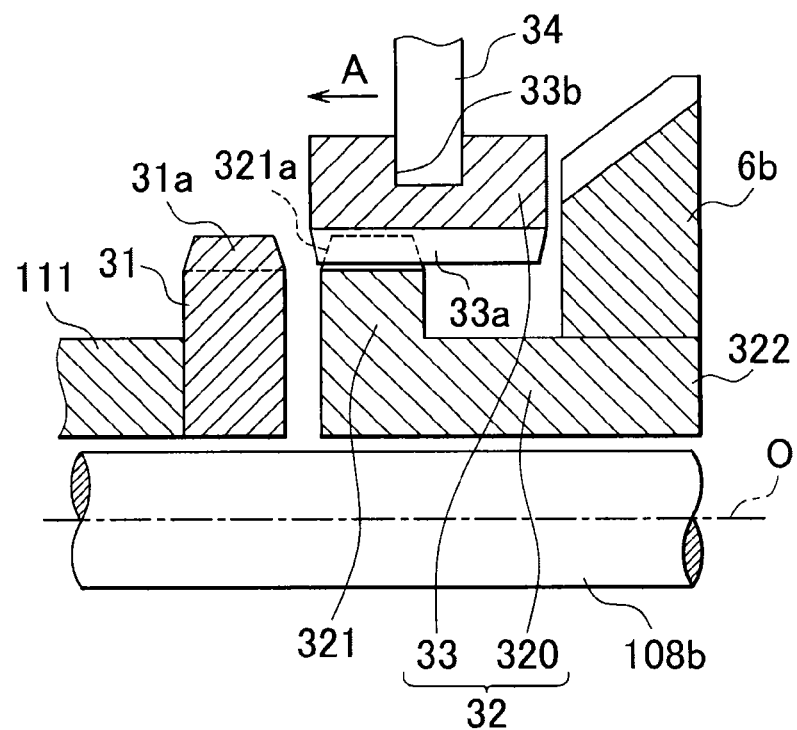
FIG. 2A is a sectional view illustrating an example of the schematic configuration of a dog clutch.

FIG. 2A is a sectional view illustrating an example of the schematic configuration of the dog clutch 3. The dog clutch 3 has a first rotary member 31 fixed to an axial end of the front differential case 111, and a second rotary member 32 that is rotatable relative to the first rotary member 31 on the same axis. The first rotary member 31 is connected to the engine 102 side, and the second rotary member 32 is connected to the right and left rear wheel 105b, 105a side, i.e., the propeller shaft 2 side. The dog clutch 3 allows transmission of the driving force from the engine 102 to the right and left rear wheels 105b, 105a by engaging the first rotary member 31 and the second rotary member 32 with each other, and interrupts transmission of the driving force from the engine 102 to the right and left rear wheels 105b, 105a by disengaging the first rotary member 31 and the second rotary member 32 from each other.

The first rotary member 31 is an annular member through which the front wheel-side drive shaft 108b is passed. The first rotary member 31 is fixed to the end of the front differential case 111, for example, with bolts, and rotates together with the front differential case 111. A plurality of spline teeth 31a is formed on the outer periphery of the first rotary member 31.

The second rotary member 32 includes a cylindrical body portion 320 and a sleeve portion 33 that is movable relative to the body portion 320 in the axial direction. The front drive shaft 108b passes through the central portion of the body portion 320. One end portion 321 of the body portion 320, which faces the first rotary member 31, has an annular shape and is larger in outer diameter than the other portion of the body portion 320. A plurality of spline teeth 321a is formed on the outer periphery of the one end portion 321. The ring gear 6b is fixed to the outer periphery of the other end portion 322 of the body portion 320, for example, with bolts so as to be non-rotatable relative to the body portion 320. The first rotary member 31 and the body portion 320 of the second rotary member 32 are supported by bearings (not illustrated) so as to be rotatable relative to a vehicle body independently from each other but immovable in the axial direction.

The sleeve portion 33 has a cylindrical shape, and a plurality of spline teeth 33a is formed on the inner periphery of the sleeve portion 33. The spline teeth 33a are constantly spline-engaged with the spline teeth 321a of the body portion 320. Thus, the sleeve portion 33 is non-rotatable relative to the body portion 320 but movable in the axial direction. The spline teeth 33a of the sleeve portion 33 are engaged with the spline teeth 31a of the first rotary member 31 when the sleeve portion 33 moves in the axial direction along a rotational axis O of the front wheel-side drive shaft 108b. Note that engagement between spline teeth means mesh between spline teeth.

Further, an annular groove 33b is formed in the outer periphery of the sleeve portion 33, and a fork 34 is slidably fitted in the groove 33b. The fork 34 is moved together with the sleeve portion 33 by an actuator (not illustrated), which is controlled by the ECU 5, in a direction indicated by an arrow A and its opposite direction, which are parallel to the rotational axis O.

Figure 2B:
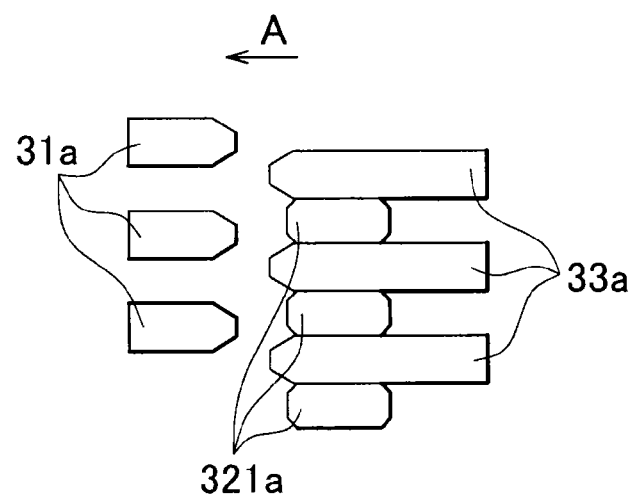
FIG. 2B is a schematic diagram illustrating an example of a state where the dog clutch is engaged.

FIG. 2B is a schematic view illustrating an example of a state of engagement between the spline teeth 31a of the first rotary member 31 and the spline teeth 321a of the body portion 320 of the second rotary member 32, and the spline teeth 33a of the sleeve portion 33. In the state illustrated in FIG. 2B, the spline teeth 321a of the body portion 320 of the second rotary member 32 are engaged with the spline teeth 33a of the sleeve portion 33, but the spline teeth 31a of the first rotary member 31 are not engaged with the spline teeth 33a of the sleeve portion 33. Therefore, the dog clutch 3 is in a disengaged state in which the first rotary member 31 and the second rotary member 32 are able to rotate relative to each other. Accordingly, transmission of torque between the front differential case 111 and the propeller shaft 2 is interrupted.

When the fork 34 and the sleeve portion 33 are moved in the direction of the arrow A from the above-described state, the spline teeth 33a of the sleeve portion 33 enter the spaces between the spline teeth 31a of the first rotary member 31, and thus the spline teeth 31a and the spline teeth 33a are engaged with each other. In the engaged state, the spline teeth 33a of the sleeve portion 33 are engaged with both the spline teeth 31a of the first rotary member 31 and the spline teeth 321a of the body portion 320 of the second rotary member 32. Therefore, the first rotary member 31 and the second rotary member 32 are not able to rotate relative to each other. As a result, the front differential case 111 and the propeller shaft 2 are coupled to each other such that torque is allowed to be transmitted therebetween.

Figure 3:
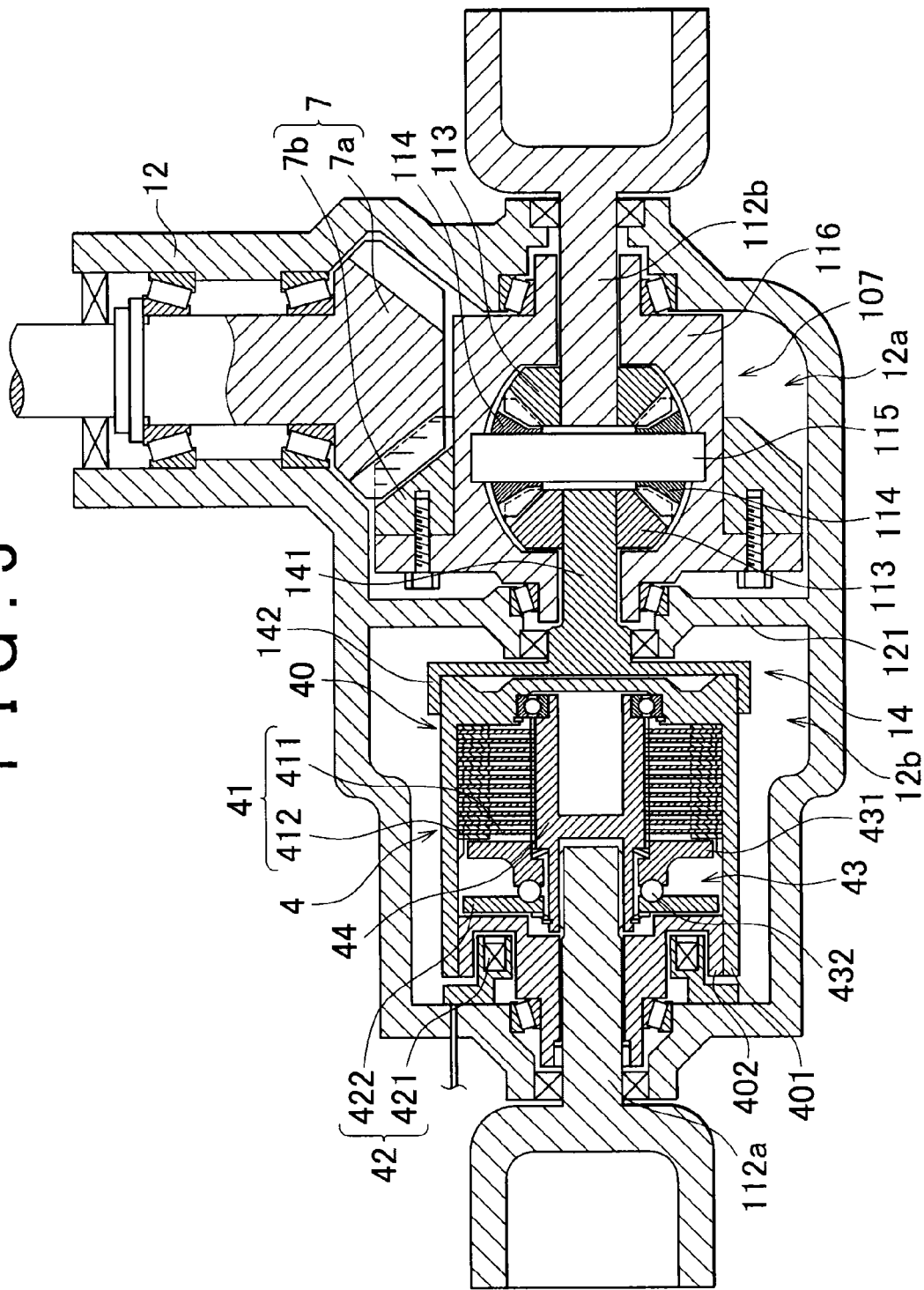
FIG. 3 is a schematic configuration diagram illustrating an example of the configuration of a torque coupling and its surrounding parts.

FIG. 3 is a view illustrating an example of the schematic configuration of the torque coupling 4 and its surrounding parts. As illustrated in FIG. 3, the torque coupling 4 includes a multiple-disc clutch 41, an electromagnetic clutch 42, a cam mechanism 43, an inner shaft 44, and a housing 40 that accommodate these components. The torque coupling 4 is accommodated, together with the rear differential 107 and the gear mechanism 7, in a rear differential carrier 12.

The space in the differential carrier 12 is partitioned liquid-tightly into a first space 12a and a second space 12b by a partition wall 121. The first space 12a in which the gear mechanism 7 and the rear differential 107 are accommodated is filled with differential gear oil (not illustrated) suitable for lubricating gears, at a predetermined filling rate. Further, the second space 12b in which the torque coupling 4 is accommodated is filled with lubrication oil (not illustrated) suitable for lubricating inner clutch plates 411 and outer clutch plates 412, which will be described later, at a predetermined filling rate.

The side gear shaft 14 has a shaft portion 141 and a flange portion 142 that are formed integrally with each other. The shaft portion 141 is connected at one end to one of the side gears 113 of the rear differential 107, and the flange portion 142 is provided at the other end of the shaft portion 141. The shaft portion 141 is passed through the partition wall 121. The torque coupling 4 is able to adjust the amount of torque that is transmitted between the side gear shaft 14 and the left rear wheel-side drive shaft 112a.

The housing 40 of the torque coupling 4 includes a first housing member 401 and a second housing member 402. The first housing member 401 and the second housing member 402 are coupled to each other so as to be non-rotatable relative to each other. The first housing member 401 has a cylindrical shape, and the second housing member 402 is arranged so as to close one end portion of the first housing member 401. The first housing member 401 of the hosing 40 and the side gear shaft 14 are coupled to each other so as to be non-rotatable relative to each other.

The multiple-disc clutch 41 is arranged between the first housing member 401 of the housing 40 and the cylindrical inner shaft 44. The multiple-disc clutch 41 includes the inner clutch plates 411 and the outer clutch plates 412. The inner clutch plates 411 are spline-engaged with the outer periphery of the inner shaft 44 so as to be non-rotatable relative to the inner shaft 44. The outer clutch plates 412 are spline-engaged with the inner periphery of the first housing member 401 so as to be non-rotatable relative to the first housing member 401. The inner shaft 44 is spline-fitted to the left rear wheel-side drive shaft 112a so as to be non-rotatable relative to the left rear wheel-side drive shaft 112a.

The electromagnetic clutch 42 includes an annular coil 421 and an armature cam 422, and is arranged on the rotational axis of the housing 40. In the electromagnetic clutch 42, the armature cam 422 is moved toward the coil 421 by an electromagnetic force generated by the coil 421. Thus, the armature cam 422 is brought into friction sliding with the second housing member 402.

The cam mechanism 43 includes the armature cam 422, a main cam 431 and spherical cam followers 432. The armature cam 422 serves as a cam member. The main cam 431 is arranged next to the armature cam 422 along the rotational axis of the housing 40. The cam followers 432 are interposed between the main cam 431 and the armature cam 422. In the cam mechanism 43, the armature cam 422 receives a rotational force from the housing 40 upon energization of the coil 421, and converts the rotational force into a pressing force that is used as a clutch force of the multiple-disc clutch 41. As the amount of electricity that is supplied to the coil 421 is increased, a force of friction between the armature cam 422 and the second housing member 402 is increased, so that the main cam 431 presses the multiple-disc clutch 41 more strongly. That is, the torque coupling 4 is able to variably control the pressing force of the multiple-disc clutch 43 on the basis of the amount of electricity that is supplied to the coil 421, thereby adjusting the amount of torque that is transmitted between the side gear shaft 14 and the left rear wheel-side drive shaft 112a.

When the amount of torque transmitted by the torque coupling 4 is sufficiently large and the side gear shaft 14 and the left rear wheel-side drive shaft 112a are rotated together with each other, the left rear wheel-side drive shaft 112a and the propeller shaft 2 are coupled to each other such that torque is allowed to be transmitted therebetween, via the gear mechanism 7, the rear differential 107, the side gear shaft 14 and the torque coupling 4. At the same time, the right rear wheel-side drive shaft 112b and the propeller shaft 2 are coupled to each other such that torque is allowed to be transmitted therebetween, via the gear mechanism 7 and the rear differential 107.

When the transmission of torque by the torque coupling 4 is interrupted so that the side gear shaft 14 and the left rear wheel-side drive shaft 112a are disconnected from each other, torque is no longer transmitted to the left rear wheel-side drive shaft 112a from the propeller shaft 2. Accordingly, torque is no longer transmitted to the right rear wheel-side drive shaft 112b from the propeller shaft 2. Note that, torque is no longer transmitted to the right rear wheel-side drive shaft 112b due to the general characteristic of a differential gear unit that if one of side gears runs idle, no torque is transmitted to the other side gear.

Thus, the torque coupling 4 is able to continuously adjust the torque that is transmitted between the propeller shaft 2 and the right and left rear wheels 105b, 105a by increasing or decreasing the torque transmission amount.

The ECU 5 includes, for example, a central processing unit (CPU) that executes processes according to programs stored in a memory element in advance and a current output circuit that is able to variably adjust a current value by executing, for example, a pulse width modulation (PWM) control, on the basis of the result of computation obtained by the CPU. The ECU 5 outputs currents for operating the dog clutch 3 and the torque coupling 4 to control the dog clutch 3 and the torque coupling 4. The ECU 5 is able to acquire various information related to the traveling state, such as the vehicle speed of the four-wheel-drive vehicle 100, the torque output from the engine 102, the accelerator operation amount, and the steering angle, via an in-vehicle communication network such as a controller area network (CAN).

The ECU 5 computes a command torque that should be transmitted to the right and left rear wheels 105b, 105a on the basis of the acquired information related to the traveling state. The ECU 5 controls the dog clutch 3 and the torque coupling 4 such that the torque corresponding to the command torque is transmitted to the right and left rear wheels 105b, 105a.

When the difference in rotational speed between the right and left front wheels 104b, 104a, and the right and left rear wheels 105b, 105a becomes large, the ECU 5 controls the dog clutch 3 and the torque coupling 4 such that the torque that is transmitted to the right and left rear wheels 105b, 105a is increased. With this control, if, for example, the right and left front wheels 104b, 104a slip, the traveling state is brought closer to that in the four-wheel-drive mode to suppress the slip of the right and left front wheels 104b, 104a. The ECU 5 controls the dog clutch 3 and the torque coupling 4 such that the torque that is transmitted to the right and left rear wheels 105b, 105a increases with an increase in the torque output from the engine 102. Thus, it is possible to prevent a slip due to transmission of excessive torque to the right and left front wheels 104b, 104a.

During, for example, a steady traveling state in which the four-wheel-drive vehicle 100 travels straight ahead at a constant speed, the ECU 5 interrupts both transmission of torque by the dog clutch 3 and transmission of torque by the torque coupling 4 to establish the two-wheel-drive mode in which rotation of the propeller shaft 2 is stopped. Thus, it is possible to suppress the rotational resistance due to agitation of the differential gear oil caused by the ring gear 7b, and the rotational resistances generated by bearings that support the propeller shaft 2 and the gear mechanisms 6, 7. As a result, it is possible to improve the fuel efficiency (travel distance per unit volume of fuel) of the four-wheel-drive vehicle 100.

When the ECU 5 switches the drive mode from the two-wheel-drive mode in which both transmission of torque by the dog clutch 3 and transmission of torque by the torque coupling 4 are interrupted, to the four-wheel-drive mode in which torque is transmitted from the engine 102 toward the right and left rear wheels 105b, 105a via the propeller shaft 2, the ECU 5 increases the torque that is transmitted by the torque coupling 4 to increase the rotational speed of the propeller shaft 2, thereby synchronizing the rotation of the propeller shaft 2 and the rotation of the right and left rear wheels 105b, 105a. The synchronization in this case signifies a state where there is no slip between the inner clutch plates 411 and the outer clutch plates 412 in the multi-disc clutch 41, and the rotational speed of the propeller shaft 2, which is set by taking into account the gear ratios of the rear differential 107 and the gear mechanism 7, and the rotational speed of the right and left rear wheels 105b, 105a substantially coincide with each other.

When the difference in rotational speed between the first rotary member 31 and the second rotary member 32 in the dog clutch 3 becomes equal to or smaller than a predetermined value, the ECU 5 controls the dog clutch 3 to engage the sleeve portion 33 of the second rotary member 32 with the first rotary member 31. Thus, the four-wheel-drive vehicle 100 is placed in the four-wheel-drive mode in which the driving force is transmitted from the engine 102 to the right and left front wheels 104b, 104a and the right and left rear wheels 105b, 105a.

If a slip occurs in at least one of the right and left front wheels 104b, 104a in the two-wheel-drive mode, the difference in rotational speed between the right and left front wheels 104b, 104a and the right and left rear wheels 105b, 105a becomes large, so that the ECU 5 determines that the drive mode should be switched to the four-wheel-drive mode and increases the torque that is transmitted by the torque coupling 4 to synchronize the rotation of the propeller shaft 2 and the rotation of the right and left rear wheels 105b, 105a. However, in the state where the slip has occurred in at least one of the right and left front wheels 104b, 104a, even if the rotation of the propeller shaft 2 and the rotation of the right and left rear wheels 105b, 105a are synchronized with each other, the difference in rotational speed between the first rotary member 31 and the second rotary member 32 in the dog clutch 3 is not reduced less than the predetermined value.

According to the present embodiment, in order to make it possible to switch the drive mode to the four-wheel-drive mode even if a slip has occurred in the right and left front wheels 104b, 104a, a command signal to execute a control to suppress the slip of the right and left front wheels 104b, 104a is output to the traction control unit 8 when the relative rotational speed between the first rotary member 31 and the second rotary member 32 of the dog clutch 3 is equal to or higher than a predetermined value. The control executed by the ECU 5 in this case will be described below.

Figure 4:
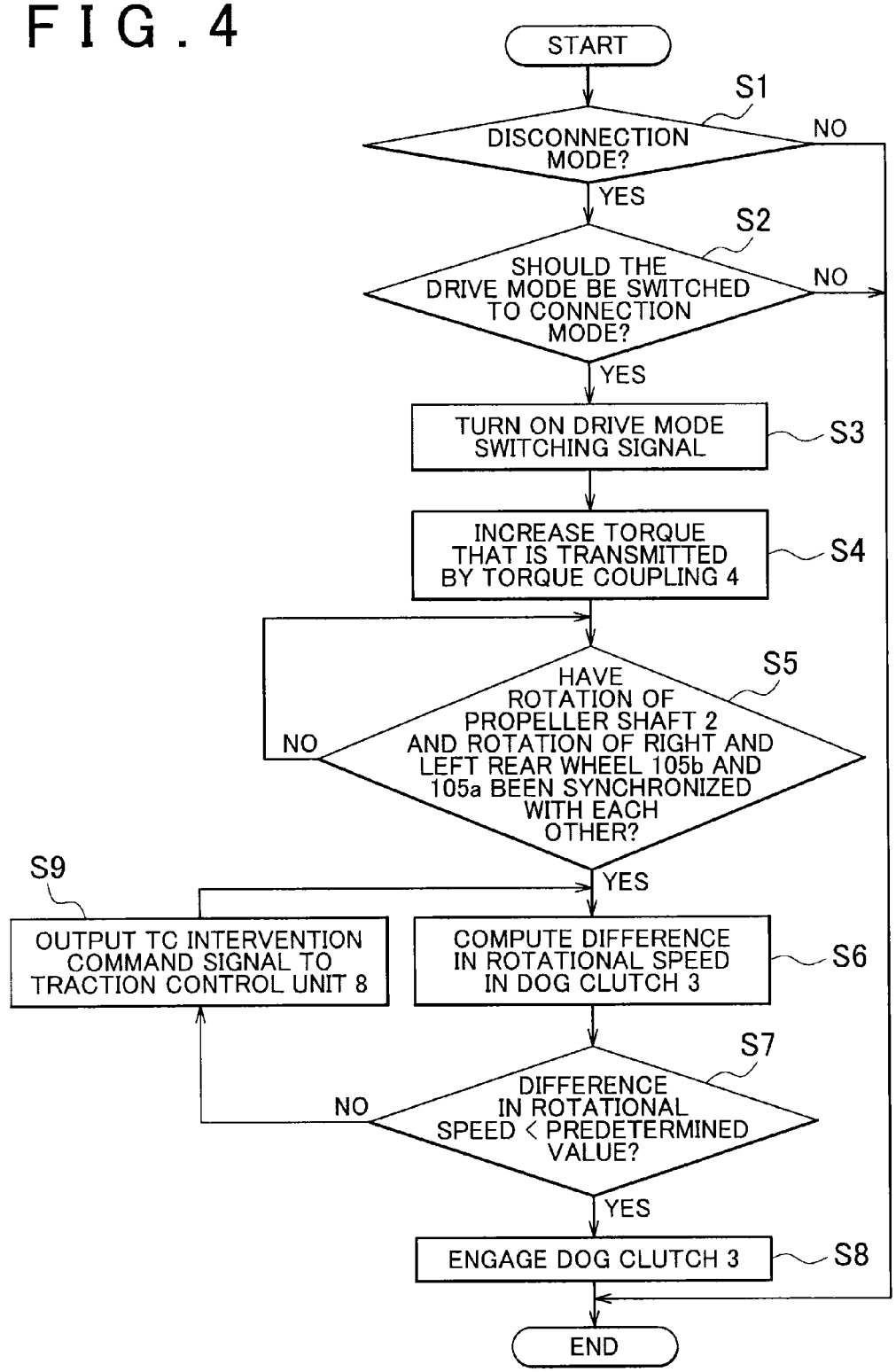
FIG. 4 is a flowchart illustrating an example of a process executed by an ECU.

FIG. 4 is a flowchart illustrating an example of a process executed by the ECU 5. The flowchart illustrates an example of a process for switching the drive mode from the two-wheel-drive mode to the four-wheel-drive mode, which is one of the processes executed by the ECU 5. In the flowchart, a disconnection mode refers to the two-wheel-drive mode, in which torque transmission by the dog clutch 3 and torque transmission by the torque coupling 4 are both interrupted, and a connection mode refers to the four-wheel-drive mode, in which the driving force is transmitted from the engine 102 to the right and left rear wheels 105b, 105a via the dog clutch 3 and the torque coupling 4.

The ECU 5 determines whether the four-wheel-drive vehicle 100 is in the disconnection mode (Step 1). If the four-wheel-drive vehicle 100 is not in the disconnection mode ("No" in S1), the ECU 5 ends the process in the flowchart illustrated in FIG. 4. The ECU 5 makes a determination on the basis of information, such as flags to which the CPU of the ECU 5 refers.

If the four-wheel-drive vehicle 100 is in the disconnection mode ("Yes" in S1), the ECU 5 determines whether to switch the drive mode to the connection mode on the basis of the travelling state, such as the difference in rotational speed between the right and left front wheels 104b, 104a and the right and left rear wheels 105b, 105a and accelerator operation amount (step S2). If the result of determination indicates that the drive mode should not be switched to the connection mode ("No" in S2), the ECU 5 ends the process in the flowchart illustrated in FIG. 4.

If the ECU 5 determines that the drive mode should be switched to the connection mode ("Yes" in S2), then the ECU 5 turns on a drive mode switching signal, which is an internal signal (step S3). When the drive mode switching signal is in the on-state, the drive mode switching signal indicates that the connection mode should be established. On the other hand, when the drive mode switching signal is in an off-state, the drive mode switching signal indicates that the disconnection mode should be established.

Then, the ECU 5 supplies current to the coil 421 of the torque coupling 4 to increase the torque that is transmitted by the torque coupling 4 (step S4). Thus, the rotary torque of the right and left rear wheels 105b, 105a is transmitted to the propeller shaft 2 via the rear differential 107 and therefore the rotational speed of the propeller shaft 2 increases. The torque that is transmitted in this step is preferably lower than the torque that is transmitted, for example, when the four-wheel-drive vehicle 100 is traveling in the four-wheel-drive mode, in order to suppress shocks due to a sudden increase in the rotational speed of the propeller shaft 2.

The ECU 5 then determines whether the rotation of the propeller shaft 2 and the rotation of the right and left rear wheels 105b, 105a are synchronized with each other (step S5). If the synchronization has not been established ("No" in S5), the ECU 5 repeatedly executes the process in step S5.

If the rotation of the propeller shaft 2 and the rotation of the right and left rear wheels 105b, 105a are synchronized with each other ("Yes" in S5), the ECU 5 computes the difference in rotational speed in the dog clutch 3, i.e., the difference in rotational speed between the first rotary member 31 and the second rotary member 32 (step S6). The rotational speed of the first rotary member 31 can be obtained on the basis of the mean value of the rotational speeds of the right and left front wheels 104b, 104a detected by the rotational speed sensors 15b, 15a, respectively. The rotational speed of the second rotary member 32 can be obtained by multiplying the rotational speed of the propeller shaft 2 detected by the rotational speed sensor 16 by the gear ratio of the gear mechanism 6 (the number of teeth of the pinion gear 6a/the number of teeth of the ring gear 6b).

The ECU 5 determines whether the difference in rotational speed computed in step S6 is smaller than a predetermined value (step S7). The predetermined value is, for example, 150 to 200 rpm.

If the difference in rotational speed is lower than the predetermined value ("Yes" in S7), the ECU 5 controls the dog clutch 3 to engage the first rotary member 31 and the second rotary member 32 with each other (step S8).

On the other hand, if it is determined in step S7 that the difference in rotational speed is not lower than the predetermined value ("No" in S7), the ECU 5 outputs a signal, which indicates that the slip of the right and left front wheels 104b, 104a should be suppressed (hereinafter, the signal will be referred to as "TC intervention command signal"), to the traction control unit 8 (step S9). Upon reception of the TC intervention command signal, the traction control unit 8 controls the braking devices 16a, 16b, and outputs a command signal to the fuel injection device 9 to reduce the amount of the fuel that is supplied to the engine 102, thereby suppressing the slip.

The ECU 5 executes the process in step S6 again to compute the difference in rotational speed in the dog clutch 3 (step S6), and determines whether the difference in rotational speed is smaller than the predetermined value (step S7). If the slip of the right and left front wheels 104b, 104a has been sufficiently suppressed by the control executed by the traction control unit 8, the difference in rotational speed becomes smaller than the predetermined value ("Yes" in step S7), and the ECU 5 controls the dog clutch 3 to engage the first rotary member 31 and the second rotary member 32 with each other (step S8). Thus, the switching of the drive mode to the connection mode is completed.

Figure 5:
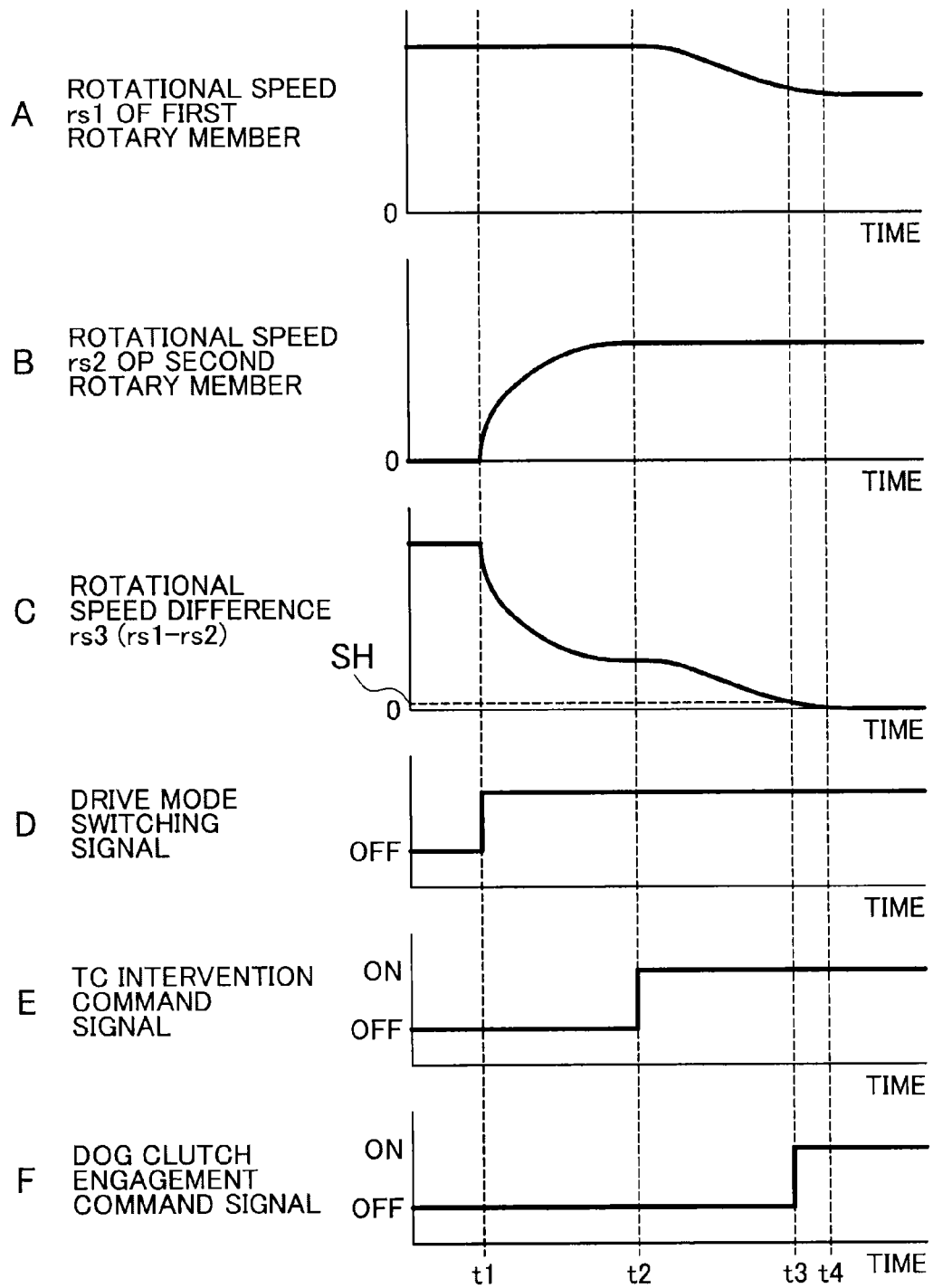
FIG. 5 is graphs illustrating an example of temporal changes in the rotational speed of a first rotary member, the rotational speed of a second rotary member, the difference in rotational speed, a drive mode switching signal, a TC intervention command signal, and a dog clutch engagement command signal during transition from a disconnection mode to a connection mode.

FIG. 5 is graphs illustrating an example of temporal changes in a rotational speed rs1 of the first rotary member 31, a rotational speed rs2 of the second rotary member 32, a rotational speed difference rs3 (=rs1–rs2), the drive mode switching signal, the TC intervention command signal, and the dog clutch engagement command signal during transition from the disconnection mode to the connection mode. In the following description, corresponding step numbers in the flowchart of FIG. 4 will be parenthesized.

When the drive mode switching signal is turned on at time t1 (S3), as illustrated in graph D of FIG. 5, the torque that is transmitted by the torque coupling 4 increases (S4), and the rotational speed rs2 of the second rotary member 32 increases, as illustrated graph B of FIG. 5. In accordance with the increase in the rotational speed rs2, the rotational speed difference rs3 (rs3=rs1–rs2) in the dog clutch 3 decreases, as illustrated in graph C of FIG. 5. However, if a slip occurs in at least one of the right and left front wheels 104b, 104a, the rotational speed difference rs3 does not fall below a predetermined value SH even when the rotation of the propeller shaft 2 and the rotation of the right and left rear wheels 105b, 105a are synchronized with each other at time t2.

At this time, the ECU 5 outputs the TC intervention command signal to the traction control unit 8 (S9), as illustrated in graph E of FIG. 5, and the traction control unit 8 executes the control for suppressing the slip of the right and left front wheel 104b, 104a according to the signal. The control decreases the rotational speed rs1 of the first rotary member 31, as illustrated in graph A of FIG. 5. In accordance with the decrease in the rotational speed rs1, the rotational speed difference rs3 decreases. When the rotational speed difference rs3 falls below the predetermined value SH at time t3, the ECU 5 turns on the dog clutch engagement command signal as illustrated in graph F of FIG. 5, to engage the first rotary member 31 and the second rotary member 32 with each other. In this way, switching of the drive mode to the connection mode is completed.

According to the present embodiment described above, the ECU 5 causes the traction control unit 8 to execute the control for suppressing the slip of the right and left front wheels 104b, 104a. This control allows prompt switching of the drive mode from the disconnection mode to the connection mode, i.e., from the two-wheel-drive mode to the four-wheel-drive mode, even when a slip has occurred. Thus, the driving stability of the four-wheel-drive vehicle 100 is enhanced.

Engagement of the dog clutch 3 is performed after the difference in rotational speed in the dog clutch 3 falls below the predetermined value. Thus, it is possible to suppress vibrations and shocks that occur during engagement of the dog clutch 3.

The control unit for a four-wheel-drive vehicle according to the invention has been described with reference to the embodiment. However, the invention is not limited to the above-described embodiment and various changes and modifications may be made within the scope of the invention. For example, in the above-described embodiment, the ECU 5 outputs the TC intervention command signal to the traction control unit 8, if the rotational speed difference rs3 in the dog clutch 3 is equal to or larger than the predetermined value when the rotation of the propeller shaft 2 and the rotation of the right and left rear wheels 105b, 105a are synchronized with each other. However, the invention is not limited to this. For example, the ECU 5 may assume that a slip has occurred and output the TC intervention command signal to the traction control unit 8, if the difference in rotational speed between the front wheels and the rear wheels (the speed difference between the mean rotational speed of the right and left front wheels 104b, 104a and the mean rotational speed of the right and left rear wheels 105b, 105a) is equal to or larger than the predetermined value when the drive mode switching signal is turned on.

What is claimed is:

1. A control unit for a four-wheel-drive vehicle, the control unit being mounted in the four-wheel-drive vehicle,
the four-wheel-drive vehicle comprising:
a dog clutch that is able to switch a drive mode between a four-wheel-drive mode, in which driving force is transmitted from a drive source to main drive wheels and auxiliary drive wheels, and a two-wheel-drive mode, in which the driving force is transmitted from the drive source only to the main drive wheels, and that allows transmission of the driving force from the drive source to the auxiliary drive wheels by engaging a first rotary member arranged on a drive source side and a second rotary member arranged on an auxiliary drive wheel side with each other, and interrupts transmission of the driving force from the drive source to auxiliary drive wheels by disengaging the first rotary member and the second rotary member from each other; and
a traction control unit that controls at least one of the driving force that is generated by the drive source and braking force that is applied to the main drive wheels to suppress a slip of the main drive wheels,
wherein the control unit for the four-wheel-drive vehicle detects a relative rotational speed between the first rotary member and the second rotary member of the dog clutch when the drive mode is being switched from the two-wheel-drive mode to the four-wheel-drive mode and, only when the detected relative rotational speed between the first rotary member and the second rotary member of the dog clutch is equal to or higher than a predetermined value, outputs a command signal to the traction control unit to execute control for suppressing the relative rotational speed between the first rotary member and the second rotary member of the dog clutch.

2. The control unit for the four-wheel-drive vehicle according to claim 1,
the four-wheel-drive vehicle further comprising:
a driving force transmission shaft to which the driving force is transmitted from the drive source by the dog clutch; and
a driving force transmission device that is able to continuously adjust torque that is transmitted between the driving force transmission shaft and the auxiliary drive wheels;
wherein transmission of the driving force by the dog clutch and transmission of the driving force by the driving force transmission device are interrupted in the two-wheel-drive mode, and
in a case where the drive mode is switched from the two-wheel-drive mode to the four-wheel-drive mode, torque that is transmitted by the driving force transmission device is increased to increase the rotational speed of the driving force transmission shaft, and the first rotary member and the second rotary member are engaged with each other when the relative rotational speed between the first rotary member and the second rotary member of the dog clutch becomes lower than the predetermined value.

3. A control unit for a four-wheel-drive vehicle, the control unit being mounted in the four-wheel-drive vehicle, the four-wheel-drive vehicle comprising:
a dog clutch that is able to switch a drive mode between a four-wheel-drive mode, in which driving force is transmitted from a drive source to main drive wheels and auxiliary drive wheels, and a two-wheel-drive mode, in which the driving force is transmitted from the drive source only to the main drive wheels, and that allows transmission of the driving force from the drive source to the auxiliary drive wheels by engaging a first rotary member arranged on a drive source side and a second rotary member arranged on an auxiliary drive wheel side with each other, and interrupts transmission of the driving force from the drive source to auxiliary drive wheels by disengaging the first rotary member and the second rotary member from each other; and
a traction control unit that controls at least one of the driving force that is generated by the drive source and braking force that is applied to the main drive wheels to suppress a slip of the main drive wheels,
wherein the control unit for the four-wheel-drive vehicle includes means for detecting a relative rotational speed between the first rotary member and the second rotary member of the dog clutch when the drive mode is being switched from the two-wheel-drive mode to the four-wheel-drive mode and means for outputting a command signal to the traction control unit to execute control for suppressing the relative rotational speed between the first rotary member and the second rotary member of the dog clutch only when the detected relative rotational speed between the first rotary member and the second rotary member of the dog clutch is equal to or higher than a predetermined value.

4. The control unit for the four-wheel-drive vehicle according to claim 3,
the four-wheel-drive vehicle further comprising:
a driving force transmission shaft to which the driving force is transmitted from the drive source by the dog clutch; and
a driving force transmission device that is able to continuously adjust torque that is transmitted between the driving force transmission shaft and the auxiliary drive wheels;
wherein transmission of the driving force by the dog clutch and transmission of the driving force by the driving force transmission device are interrupted in the two-wheel-drive mode, and
in a case where the drive mode is switched from the two-wheel-drive mode to the four-wheel-drive mode, torque that is transmitted by the driving force transmission device is increased to increase the rotational speed of the driving force transmission shaft, and the first rotary member and the second rotary member are engaged with each other when the relative rotational speed between the first rotary member and the second rotary member of the dog clutch becomes lower than the predetermined value.

* * * * *